United States Patent [19]

Ullman

[11] 4,454,704
[45] Jun. 19, 1984

[54] HEAT CONTROL SYSTEM FOR PACKAGING MACHINE

[75] Inventor: John E. Ullman, Huntingdon Valley, Pa.

[73] Assignee: The Mead Corporation, Atlanta, Ga.

[21] Appl. No.: 322,443

[22] Filed: Nov. 18, 1981

[51] Int. Cl.³ .................................................. B65B 57/06
[52] U.S. Cl. .......................................... 53/76; 53/373; 53/379; 156/359
[58] Field of Search ...................... 53/477, 478, 76, 77, 53/69, 67, 70, 373, 379, 397; 156/359, 363, 367, 378

[56] References Cited

U.S. PATENT DOCUMENTS

| | | | |
|---|---|---|---|
| 3,016,085 | 1/1962 | Gassner | 156/359 |
| 3,101,898 | 8/1963 | Mader, Jr. | 156/359 X |
| 3,151,428 | 10/1964 | Mader, Jr. et al. | 53/373 |
| 3,579,407 | 5/1971 | Rochla | 156/583 |
| 3,619,325 | 11/1971 | Hair et al. | 156/359 |
| 3,679,518 | 7/1972 | Andler et al. | 156/367 X |
| 3,729,894 | 5/1973 | Stohlquist | 53/76 X |
| 3,890,763 | 6/1975 | Ullman | 53/478 X |
| 4,060,959 | 12/1977 | Fiedler et al. | 53/373 |
| 4,365,456 | 12/1982 | Ullman | 53/375 X |

Primary Examiner—Horace M. Culver
Attorney, Agent, or Firm—B. J. Powell

[57] ABSTRACT

A heat control system used in apparatus for packaging articles in a tray by applying a film of thermoplastic material over the articles in the tray. The apparatus includes a plurality of electrically operated heating units successively moving along a prescribed path and adapted to captivate each tray and the film over the articles in the tray between adjacent heating units as the heating units move along a prescribed portion of the prescribed path to press the film against opposite sides of the tray and heat the film to a temperature to cause the film to bond to the tray. The heat control system includes temperature control means for controlling the temperature of each of the heating units, detection means for detecting when each of the heating units is in position to press the film against the tray, and timing means connecting the temperature control means and the detection means so that the timing means is activated while the detection means detects that the heating unit is in position to press the film against the tray to cause the temperature control means to lower the temperature of the heating unit from a prescribed higher welding temperature sufficient to bond the film to the tray to a prescribed lower holding temperature to prevent deterioration of the film after a prescribed period of time and to cause the temperature control means to raise the temperature of the heating unit back to the prescribed higher welding temperature after the heating unit releases the film. The method of operating the apparatus is also disclosed.

13 Claims, 6 Drawing Figures

HEAT CONTROL SYSTEM FOR PACKAGING MACHINE

BACKGROUND OF THE INVENTION

This invention relates generally to the packaging of articles such as cans, bottles and the like in paperboard trays and more particularly to the packaging of these articles by applying a sheet of film over the articles in the tray and causing the film to bond to the tray by heating the film so as to hold the articles in the tray.

Machines which package articles in paperboard trays by applying a sheet of film over the articles and bonding the film to the tray by heating the film are known in the prior art. Such machines have been produced by Huntingdon Industries of Bethayres, Pa., under the trade name "Wrapcap." In these machines, open top paperboard trays loaded with the articles to be packaged are moved along a prescribed path. As the trays are conveyed along the path, a sheet of thermoplastic film is dispersed over the articles in the tray and wrapped over the articles in the tray by a plurality of flight bars moving along an endless path. The flight bars mount heating units thereon that press the film against opposite sides of the tray and heat the film sufficiently to cause the film to adhere or weld to the tray. After the film is welded to the tray, the film is severed between trays to separate them with the film bonded to the tray holding the articles in the tray to form an integral package. Typically, the film used is heat shrinkable and the thusly formed package is heated so as to shrink the film and tightly lock the articles in the tray.

In these machines, the heating units are continuously heated so that the heating surface on the heating unit coming in contact with the film is maintained at a substantially constant temperature sufficiently high to cause the film to weld or bond to the tray while the heating unit is pressing the film against the tray. The length of time that the film is pressed against the tray is determined by the speed at which the machine is operated since the flight bars move along a fixed endless path. This speed is determined by the rate at which the trays are fed to the flight bars so that the minimum time the film is pressed against the tray occurs when the machine is operating at maximum capacity. Since the welding or bonding of the film to the tray is also dependent on the time that the film is heated while being pressed against the tray, the minimum welding time occurs when the machine is operating at maximum capacity. Thus, the machine is designed so that, when the machine is operating at capacity, the speed of operation is such that the time the film is pressed against the tray is sufficient to effect welding of the film to the tray.

In practice, however, the flow of trays to the packaging machine may be interrupted so that the operational speed of the machine is reduced or stopped. This causes the length of time that the heating units press the film against the tray to be increased. This has created problems in that, if the film is held at welding temperature for too long a period of time, many of such films exhibit an undesirable characteristic of melting or burning through. This is especially true of monolayer films. In an attempt to overcome this burn through problem, special films such as multilayer films which do not exhibit this burn through phenomenon were used in these machines. Since these special films are usually more expensive than those which exhibit burn through characteristics, they thus increased the overall packaging costs of the trays.

SUMMARY OF THE INVENTION

These and other problems associated with the prior art are overcome by the invention disclosed herein by the provision of means for reducing the temperature of the heating units pressing the film against the tray after the film has been bonded or welded to the tray to a holding temperature at which burn through is not experienced if the tray flow to the machine is interrupted. After the tray is discharged from the heating unit, the temperature of the heating unit is again raised back to welding temperature as it returns back to the position to receive another tray. The holding temperature to which the heating unit is reduced remains sufficiently high for the heating unit to recover to the higher sealing temperature as it moves from the discharge of the completed package back to the position to receive another tray.

In the packaging machine incorporating the invention, a plurality of flight bars are successively moved along an endless path oriented normal to the endless path along which they are moved. Each of the flight bars mounts a heating unit on the leading side thereof and a heating unit on the trailing side thereof. As the flight bars move along the lower flight of the endless path, the film is wrapped over the tops of the articles in the tray and the tray captivated between adjacent flight bars so that the heating unit on the trailing side of the flight bar leading the tray presses the film against the leading side of the tray while the heating unit on the leading side of the flight bar trailing the tray presses the film against the trailing side of the tray. A separate temperature controller connects each heating unit on each of the flight bars to a common endless bus bar so that each heating unit is continuously powered as it moves along the endless path. Each temperature controller selectively controls the temperature of the heating unit connected thereto in response to a control voltage thereto.

A welding voltage source is provided to supply a first control voltage to the temperature controller to cause the temperature controller to maintain the heating unit controlled thereby at a welding temperature such that the film will be bonded or welded to the tray when the heating unit presses the film against the tray. A holding voltage source is provided to supply a second control voltage to the temperature controller to cause the temperature controller to maintain the heating unit controlled thereby at a holding temperature below the welding temperature such that the film will not melt or burn through while the heating unit is pressing the film against the side of the tray. A time delay mechanism is provided for alternatively connecting the first and second control voltages to the temperature controller and detection means is provided for detecting when the heating unit is pressing the film against the tray and operating the time delay mechanism.

When the time delay mechanism is in its normal state, the first control voltage is connected to the temperature controller to maintain the heating unit at welding temperature. When the detection means detects the heating unit pressing the film against the tray, the time delay mechanism is activated and remains activated until the detection means detects that the heating unit is no longer pressing the film against the tray. After the heating unit at welding temperature has been pressed against the tray for a sufficient period of time for the film to be welded to the tray and the time delay mechanism remains activated, the time delay mechanism times out before burn through of the film is experienced. When the time delay mechanism times out, it transfers to disconnect the first control voltage from the temperature controller and connect the second control voltage from the holding temperature source to the temperature controller. The time delay mechanism maintains the second control voltage connected to the temperature controller until it is deactivated as the heating unit releases the film. This causes the temperature controller to reduce the temperature of the heating unit to the holding temperature so that burn through of the film is not experienced. When the heating unit releases the film and the time delay mechanism is deactivated so that the first control voltage is reconnected to the temperature controller, the temperature of the heating unit is raised back to welding temperature as the heating unit traverses the upper flight of its endless path back to a position to receive another tray. The holding temperature to which the heating unit is lowered is sufficiently high for the heating unit to recover to welding temperature by the time it returns to receive another tray for welding.

These and other features and advantages of the invention disclosed herein will become more apparent upon consideration of the following specification and accompanying drawings wherein like characters of reference designate corresponding parts throughout the several views and in which:

These figures and the following detailed description disclose specific embodiments of the invention; however, it is to be understood that the inventive concept is not limited thereto since it can be incorporated in other forms.

DETAILED DESCRIPTION OF ILLUSTRATIVE EMBODIMENTS

Figure 1:
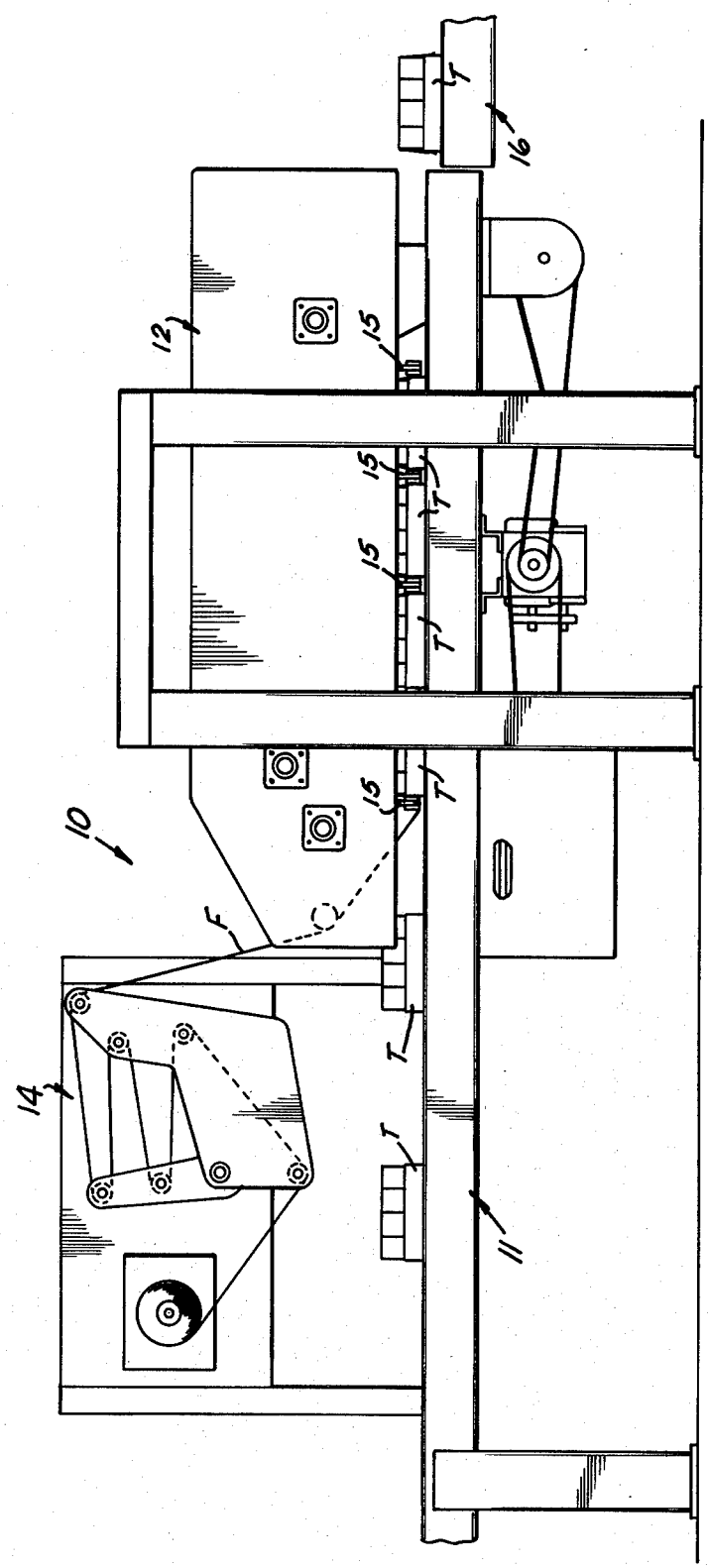
FIG. 1 is a side view of a packaging machine embodying the invention.

Referring to FIG. 1, the invention is incorporated in a packaging machine 10 which applies a sheet of thermoplastic film over the tops of articles such as bottles, cans and the like carried in an open top corrugated paperboard tray. The machine bonds or welds the film sheet to opposite side walls on the paperboard tray by heating the film while it is pressed against the side walls of the tray whereby the articles are retained in the tray by the film welded thereto. The mechanical arrangement of the packaging machine is illustrated in my earlier U.S. Pat. No. 3,890,763, issued June 24, 1975, and my co-pending U.S. application Ser. No. 683,611, filed May 5, 1976. For sake of illustration, the packaging machine 10 includes an infeed section 11 which feeds the trays T loaded with articles to a compression and welding section 12. As the loaded tray T enters the compression and welding section 12, a continuous sheet of film F dispensed from a constant tension unwinder 14 is applied over the tops of the articles in the tray. The compression and welding section 12 is provided with a plurality of flight bars 15 moving along an endless path which draw the sheet of film tautly over the articles in the tray and press the film against opposite sides of the tray. While the film is pressed against the sides of the tray, it is heated sufficiently to cause the film to bond or weld to the sides of the tray. The flight bars 15 are equipped with cutters (not shown) that sever the film between the trays after it has been welded thereto to separate the film covered trays from each other. The trays are discharged from the compression and welding section 12 onto an outfeed section 16 which moves the trays out of the machine. Typically, the film covered trays are then moved through a shrink tunnel (not shown) which heat shrinks the film to form a tight package.

Figure 2:
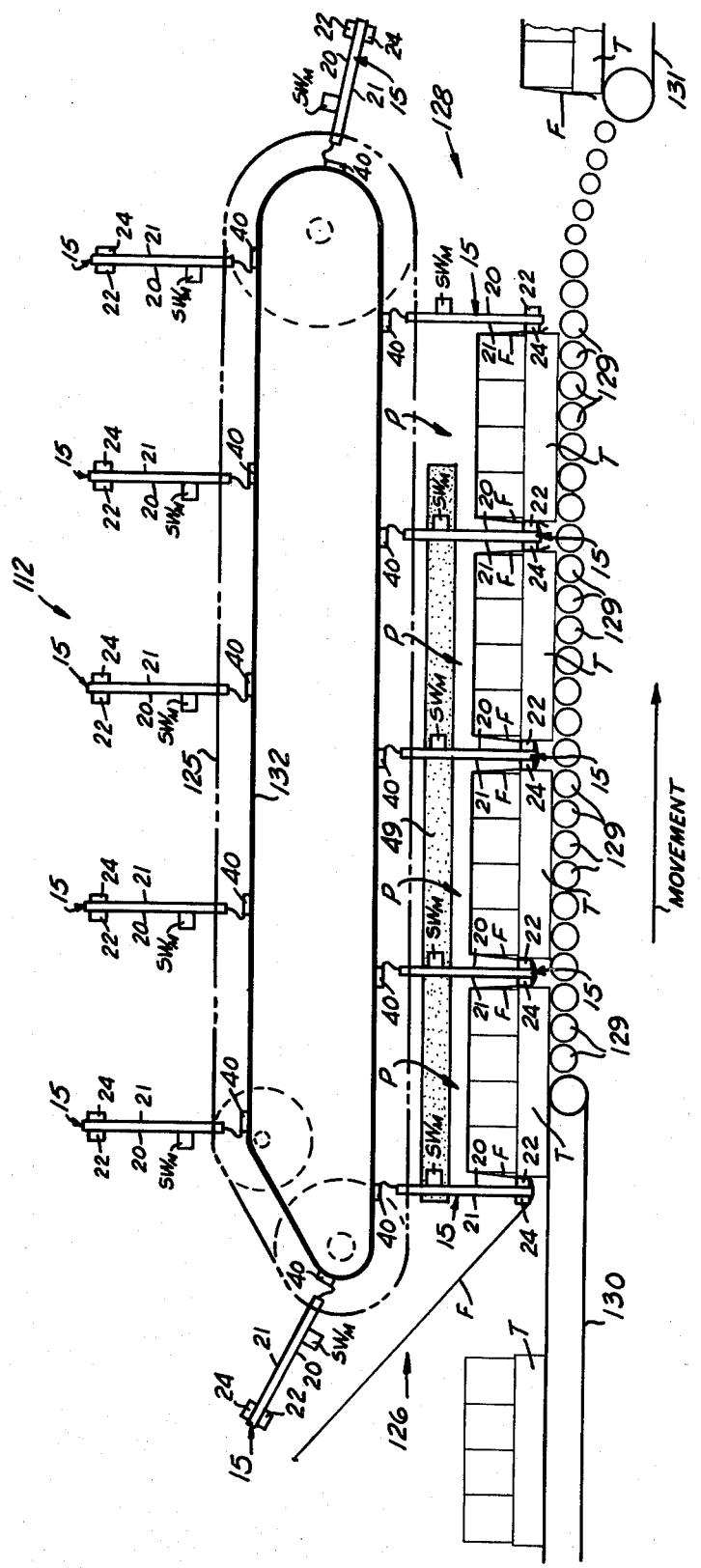
FIG. 2 is a schematic drawing illustrating one type of compression and welding section of the machine embodying the invention.

There are two general types of these machines 10, a non-adjustable version designed to handle one size of trays and an adjustable version designed to accommodate different sizes of trays. FIG. 2 schematically illustrates the compression and welding section of the non-adjustable version of the packaging machine while FIG. 5 shematically illustrates the compression and welding section of the adjustable version of the packaging machine.

The flight bars 15 of both versions of the machine have substantially the same construction. As will become more apparent, the flight bars 15 as seen in FIGS. 2 and 5 are oriented normal to the path of movement of the trays through the compression and welding section so that each flight bar has a leading side 20 and a trailing side 21. The leading side 20 mounts a leading heating unit 22 thereon adapted to engage the film F and press it against the trailing side wall of the tray T leading the flight bar 15 as it is moved through the machine. The trailing side 21 of the flight bar 15 mounts a trailing heating unit 24 thereon adapted to engage the film F and press it against the leading side wall of the tray T trailing the flight bar 15. The leading and trailing heating units 22 and 24 have the same construction. Each heating unit 22 and 24 has an electrically operated resistive heating element schematically shown as element 25 in FIGS. 3, 4 and 6 which is resiliently mounted in a resilient pressure pad on the flight bar 15 and covered with an appropriate cover to prevent the heating unit from sticking to the film when it is heated as is known in the art. The heating elements heat the heating units 22 and 24 so that, as they press the film against the side walls of the tray, the film will be heated to welding temperature to cause the film to bond to the tray.

The flight bar 15 is equipped with a film cutting mechanism (not shown) of known construction which can be selectively extended from the projecting end of the flight bar 15 between the heating units 22 and 24. This cutting mechanism serves to sever the film passing under the flight bar between adjacent trays in known manner so as to separate the film between adjacent trays after the film has been bonded or welded to the side walls of the trays.

Turning now specifically to FIG. 2, it will be seen that the compression and welding section designated 112 is designed to apply film to one size of trays. The flight bars 15 are mounted between a pair of endless chains schematically illustrated at 125 so that the flight bars 15 successively move along an endless path. The flight bars 15 are attached to the chains 125 so that they project outwardly therefrom at a fixed spacing along the chains. The chains are positioned so that, as the flight bars 15 move along the lower horizontal flights of chains 125, they are vertically oriented at fixed distances from each other. The chains 125 move in a counterclockwise direction as seen in FIG. 2 so that the flight bars 15 move from the infeed end 126 of section 112 to the discharge end 128 of section 112 (to the right in FIG. 2) as they move along the lower flights of chains 125 and return along the upper flights of the chains.

A plurality of free turning and/or driven support rollers 129 are provided below the lower flights of chains 125 to support the trays T on the tops thereof so that the heating units 22 and 24 on the flight bars 15 will engage the side walls of the trays as the flight bars 15 move along the lower flights of chains 125. The spacing between the flight bars 15 is such that, as they move along the lower flights of the chains 125, the trays will be captivated between adjacent flight bars 15 and moved thereby over the rollers 129.

The film F extends under the lower projecting ends of the flight bars 15 moving along the lower flights of chains 125 and is maintained under tension by the unwinder 14 seen in FIG. 1. Each loaded tray T is fed toward the trailing side of that flight bar 15 on the lower flights of chains 125 at the infeed end 126 of section 112 on the powered infeed conveyor 130. The spacing of the trays on the infeed conveyor 130 is such that the incoming trays do not interfere with the movement of the flight bars as they are moved by chains 125 as is known in the art. This action forces the leading side wall of the incoming tray against the trailing heating unit 24 on the flight bar 15 so that the film F extends up between the heating unit 24 and the leading side wall of the tray and over the articles in the tray. The chains 125 are then advanced in known manner with the infeed conveyor 130 maintaining the tray against the flight bar. As the next flight bar 15 moves onto the lower flights of chains 125, the projecting end thereof engages the top of the film and pulls it tautly over the top of the articles in the tray. As this next flight bar moves into the vertical position on the lower flight of the chains 125, the heating unit 22 on the leading side thereof forces the film against the trailing side wall of the tray. The spacing between the flight bars 15 is such that the film is forced against the side walls of the tray with the necessary pressure to cause the film to bond or weld to the side walls of the tray when the film is heated to welding temperature. Thus, it will be seen that adjacent flight bars 15 form a pocket P therebetween as they move along the lower flights of chains 125 in which the film wrapped tray is carried as the flight bars move toward the discharge end 128 of the section 112. As the tray in the pocket is moved through the section 112, the heating units 22 and 24 heat the film in contact with the opposite side walls of the tray to welding temperature to affect bonding or welding of the film to the tray side walls. Since the film is continuous, it remains connected to the trays in the adjacent pockets. To separate the film between the trays, the cutting mechanism in the flight bar is activated after the film is welded to the tray to separate the trays. When the flight bar 15 leading the tray reaches the discharge end of section 112, it moves off the lower flights of chains 125 and up toward the upper return flights thereof. This frees the tray with the film welded thereto so that the tray is deposited on a discharge conveyor 131 for discharge from the section 112 in known manner.

The bonding or welding of the film to the tray side walls is dependent on the temperature, contact pressure, and time to produce acceptable welds between the tray and film. In other words, the film must be pressed against the tray at a prescribed pressure while the film is heated to a temperature within the welding temperature range of the film and maintained at such temperature for a sufficient period of time for the film to bond or weld to the tray side wall. The spacing between the flight bars 15 is selected so that the film will be pressed against the tray in each pocket P with the desired contact pressure. The heating units 22 and 24 are electrically powered continuously from an endless bus bar 132 as they move around the endless path of movement on chains 125 so that they can be normally maintained at the temperature to which the film is to be heated as will become more apparent. The time during which the film is heated during normal operation is thus determined by the length of time it takes each pocket P carrying a tray to move from the infeed end to the discharge end of the section 112. The compression and welding section is designed so that the flight bars 15 advance one position each time a tray is received. Thus, when trays are fed to section 112 at its designed capacity, the minimum time it takes a pocket P to advance from the infeed to discharge end of the section 112 is encountered. Thus, the number of pockets P selected to be maintained under compression at the same time is such that each pocket is maintained under compression for a period of time exceeding that required to affect welding of the film when the section 112 is operating at design capacity.

Many of the films which can be bonded or welded to the tray exhibit an undesirable characteristic of melting or burning through at the welds if held at welding temperature for too long a period of time. This is especially true for monolayer film. This burn through time is, of course, longer than the time required to affect welding of the film to the tray side walls. To prevent burn through in the film when the machine is operating at its designed capacity, the number of pockets P selected to be maintained under compression at the same time is such that each pocket is not maintained under compression for a period of time exceeding the burn through time of the film being used. If the flow of trays to section 112 is interrupted, however, the time that the pockets P remain in compression may be extended beyond the burn through time for the film. To prevent film burn through, a control circuit 135 is provided which causes the temperature of the heating units 22 and 24 associated with each pocket P to be reduced to a holding temperature low enough to prevent film burn through if the pocket P remains in compression for a period of time exceeding the burn through time. It will be appreciated that the temperature of the heating units at each pocket will not be reduced while the section 112 is operating at its normal speeds as will become more apparent.

Figure 3:
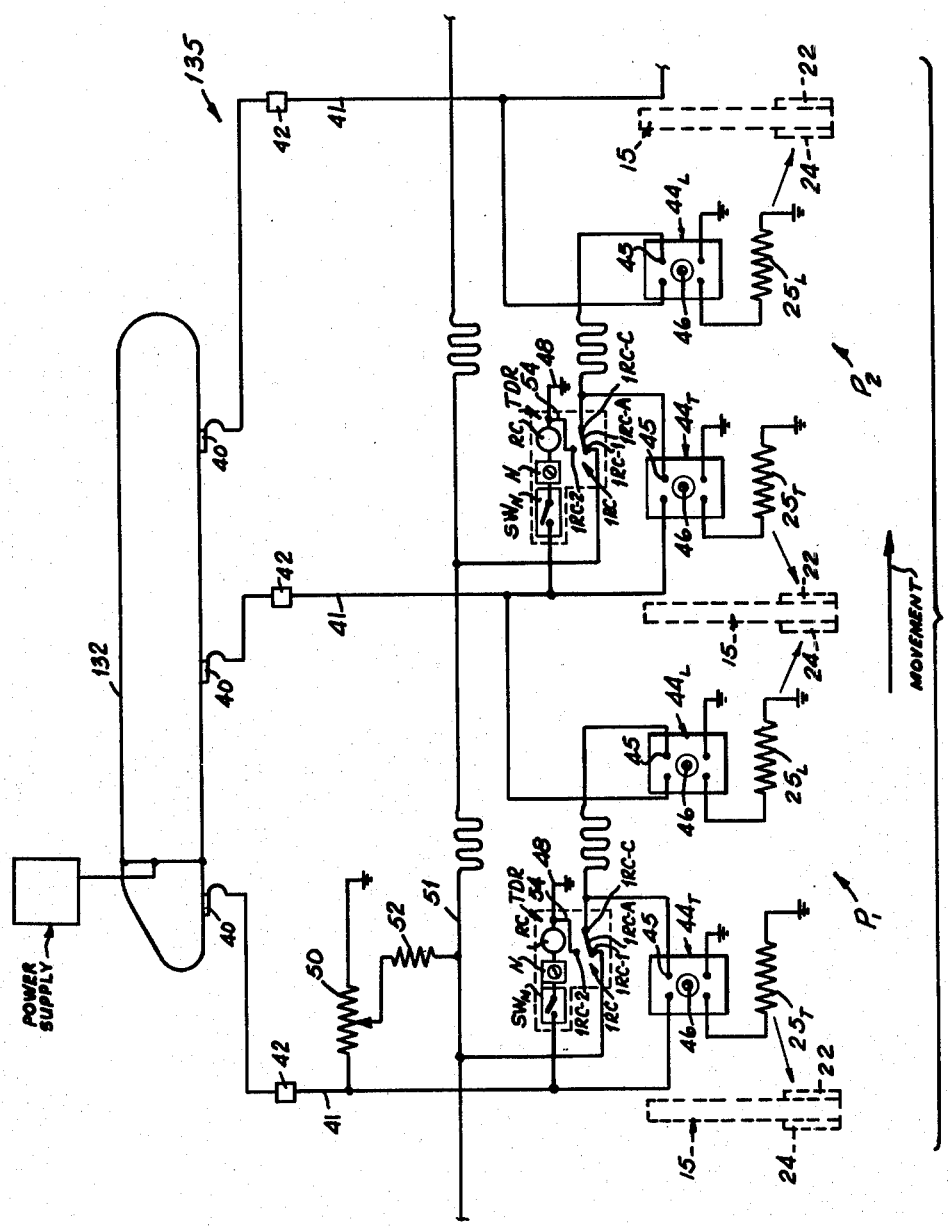
FIG. 3 is an electrical schematic drawing illustrating a control circuit for the compression and welding section illustrated in FIG. 2.

FIG. 3 schematically illustrates a portion of the control circuit 135 which includes the heating units 22 and 24 associated with two of the pockets designated $P_1$ and $P_2$ for purposes of clarity. In each pocket, it will be seen that the trailing heating unit 24 on the flight bar 15 leading the tray presses the film against the leading side wall of the tray while the leading heating unit 22 on the flight bar 15 trailing the tray presses the film against the trailing side wall of the tray. To distinguish the heating elements of these heating units, the heating element for heating unit 24 on the leading side of each pocket has been individually designated $25_L$ while the heating element for the heating unit 22 on the trailing side of each pocket has been individually designated $25_T$.

Each flight bar 15 is provided with a slider contact 40 to bus bar 132 to power a wire 41 through an appropriate fuse 42. Each of the heating elements 25 in the heating units 22 and 24 carried by the flight bar 15 is individually connected to the hot wire 41 by a separate temperature controller 44. Using the convention adopted for the heating elements, the controller for the heating element $25_L$ has been designated $44_L$ while the controller for heating element $25_T$ has been designated $44_T$.

The heating elements 25 are constructed so that their resistances vary linearly with temperature. Such heating elements are commercially available as etched foil heaters. The temperature controllers 44 are responsive to the change in resistance of the heating elements 25 to power the heating elements in such a manner that the temperature maintained in its associated heating unit can be controlled by the controller 44. While a number of different controller constructions may be utilized to control the heating elements 25, one controller 44 which has been used satisfactorily is a controller designated 68E07 manufactured by Athena Controls Incorporated of West Conshohocken, Pa. Controller 44 is adjustable so that the temperature maintained by heating element 25 can be changed. Controller 44 has a control input 45 which causes the temperature in the heating element 25 controlled thereby to be changed in response to the voltage at input 45 in known manner. Controller 44 is further provided with a trim potentiometer 46 to further adjust the temperature maintained in heating element 25 in known manner. The trim potentiometer 46 allows a common voltage to be applied to the control inputs 45 of all of the temperature controllers 44 and then the trim potentiometer 46 of each controller 44 to be individually adjusted until the temperatures maintained by all of the heating elements 25 are the same in known manner.

The control inputs 45 of the leading and trailing temperature controllers $44_L$ and $44_T$ associated with each pocket P are connected to the common contact 1RC-C of relay switch 1RC in time delay relay TDR. As will become more apparent, the normally closed contact 1RC-1 of switch 1RC is connected to a welding voltage source while the normally open contact 1RC-2 of switch 1RC is connected to a holding voltage source. The time delay relay TDR is controlled by a detection switch $SW_M$ mounted on the flight bar 15 trailing the pocket P. The detection switch $SW_M$ serves to detect when a tray is in compression in the socket P so that the time that the film is being heated can be monitored as will become more apparent.

The normally open contacts of switch $SW_M$ connect one side of the coil RC to the hot wire 41 to the flight bar 15 mounting the switch through the time delay network N in relay TDR. The other side of coil RC is connected to ground through wire 48. The time delay network N illustrated is adjustable in known manner. The switch $SW_M$ is magnetically actuated to close the contacts thereof and a magnetic strip 49 as illustrated in FIG. 2 is provided to actuate switch $SW_M$ when the pocket P associated therewith moves into position where a tray is held in compression and continues to maintain switch $SW_M$ actuated until the tray is discharged out of pocket P. Thus, the strip 49 is mounted at a fixed position in the section 112 adjacent the path of movement of switch $SW_M$ as the flight bars 15 move along the lower flights of chain 125 and has a length such that switch $SW_M$ will remain actuated as long as a tray is maintained in compression in the pocket P. Thus, the contacts of switch $SW_M$ close as soon as the tray is compressed in the pocket P to connect the time delay relay to wire 41 as soon as the time delay network N times out, coil RC is energized to transfer the switch arm 1RC-A from contact 1RC-1 to contact 1RC-2 and maintains the relay switch 1RC transferred until the switch $SW_M$ is deactuated.

While different constructions may be used for switch $SW_M$ and time delay relay TDR, one such construction is commercially available from the R. B. Denison Operation of Gould, Inc., in Bedford, Ohio, as the Denison Model No. SGC-8142-TD1-587. This unit incorporates both switch $SW_M$ and relay TDR in a common housing.

The welding voltage source comprises a master potentiometer 50 powered from one of the wires 41. The adjustable output from potentiometer 50 is connected to a common control hot wire 51 through a voltage limiting resistor 52. The control hot wire 51 is connected to the normally closed contact 1RC-1 of each of the time delay relays TDR associated with the flight bars 15. Thus, it will be seen that the adjustable voltage output from potentiometer 50 can be supplied to the control input 45 of each temperature controller 44 when the switch arm of its associated relay TDR is closed on contact 1RC-1. The resistor 52 serves to limit the voltage output of the potentiometer 50 to the desired level (approximately 24 volts in the embodiment illustrated) and also acts to prevent current overloads in the temperature control loop of the circuit in the event of a short in the loop and is typically selected to have a resistance value of about one-half that of the total resistance of the temperature control loop with all of the controllers 44 arranged in parallel and connected to the temperature control loop.

The holding voltage source of this particular embodiment is electrical ground. A shunt wire 54 connects the normally open contact 1RC-2 to ground so that a zero voltage is applied to the control input 45 of the temperature controllers $44_L$ and $44_T$ connected to switch 1RC when the switch arm is closed on contact 1RC-2. It will be appreciated that the holding voltage source may be provided by the adjustable output of an appropriate potentiometer. In the particular temperature controllers 44 illustrated, the trim potentiometer 46 of each has sufficient adjustability and range to cause the desired holding temperature to be maintained by the heating element 25 controlled by it when the control voltage is zero. If such did not have this capability, then a potentiometer would be used to supply the desired control voltage.

Both the welding and holding temperatures may vary between different kinds of film. Likewise, the maximum permissible welding time before burn through of the film is encountered may likewise vary between different kinds of film. Another factor which must be considered is that the heating units 22 and 24 must have the capability of returning to welding temperature as they return from the discharge end 128 of section 112 to the infeed end 126 while operating at design capacity. Typically, this return time is not sufficient for the heating units to recover to welding temperature if the heating units are turned off after the permissible welding time is exceeded.

To set up the section 112 for operation, the input 45 of each of the temperature controllers 44 is grounded. The trim potentiometer 46 on controller 44 is then adjusted until the desired holding temperature is being maintained in the heating unit by the heating element 25 connected to controller 44. This process is repeated until all of the controllers 44 maintain the same holding temperature in the heating unit controlled by each. It will be appreciated that this also trims all of the temperature controllers so that all of the heating units are maintained at a common temperature. Then, with the control inputs on the temperature controllers connected to the output of master potentiometer 50, potentiometer 50 is adjusted until the desired welding temperature is maintained in each heating unit. The time delay network N in each time delay relay is adjusted to the desired maximum permissible welding time. The compression and welding section 112 is now ready for operation.

At the same time as each pocket P compresses the film against the tray, the switch $SW_M$ associated with that pocket moves into proximity with magnetic strip 49 and is closed. This starts the timing of relay TDR controlled thereby and allows this timing to continue until the tray is discharged from the pocket. Under normal operation, the pocket P will discharge the tray before relay TDR times out so that the input 45 on controller 44 remains connected to the master potentiometer 50. In the event of an interruption in the flow of trays to section 112 so that the tray in the pocket P remains in compression when the relay TDR times out, the switch arm 1RC-A transfers to close contact 1RC-2 and switch the inputs 45 on controllers $44_L$ and $44_T$ connected thereto to ground. This causes controllers $44_L$ and $44_T$ to lower the temperature of the heating elements $25_L$ and $25_T$ to the holding temperature at which burn through will not occur. The elements $25_L$ and $25_T$ remain at this lower holding temperature until the tray is discharged whereupon switch $SW_M$ opens to de-energize relay TDR and reconnect the inputs 45 on controllers $44_L$ and $44_T$ to potentiometer 50. As the heating units 22 and 24 return to the infeed end 126 of section 112, the controllers $44_L$ and $44_T$ can return them back to welding temperature.

While any film which is weldable can be used, monolayer films of low density polyethylene with thicknesses of about 0.0015 to 0.003 inch are commonly used. With such polyethylene film having a thickness of about 0.002 inch a welding temperature in the range of 250°–300° F. is typically used. A holding temperature in the range of about 215°+5° F. has been used without significant burn through while still allowing recovery to welding temperature on return. A maximum permissible welding time in the range of 5–10 seconds before the temperature of the heating units is reduced from welding temperature to holding temperature has been used without significant burn through. Usually, good welds are achieved between the film and tray after a welding time of about 3–4 seconds. This allows reasonable variances in normal operating speeds before the relays TDR become effective to lower the temperature of the heating units so that the switching of the temperature control components is minimized to maximize the useful life thereof.

Figure 4:
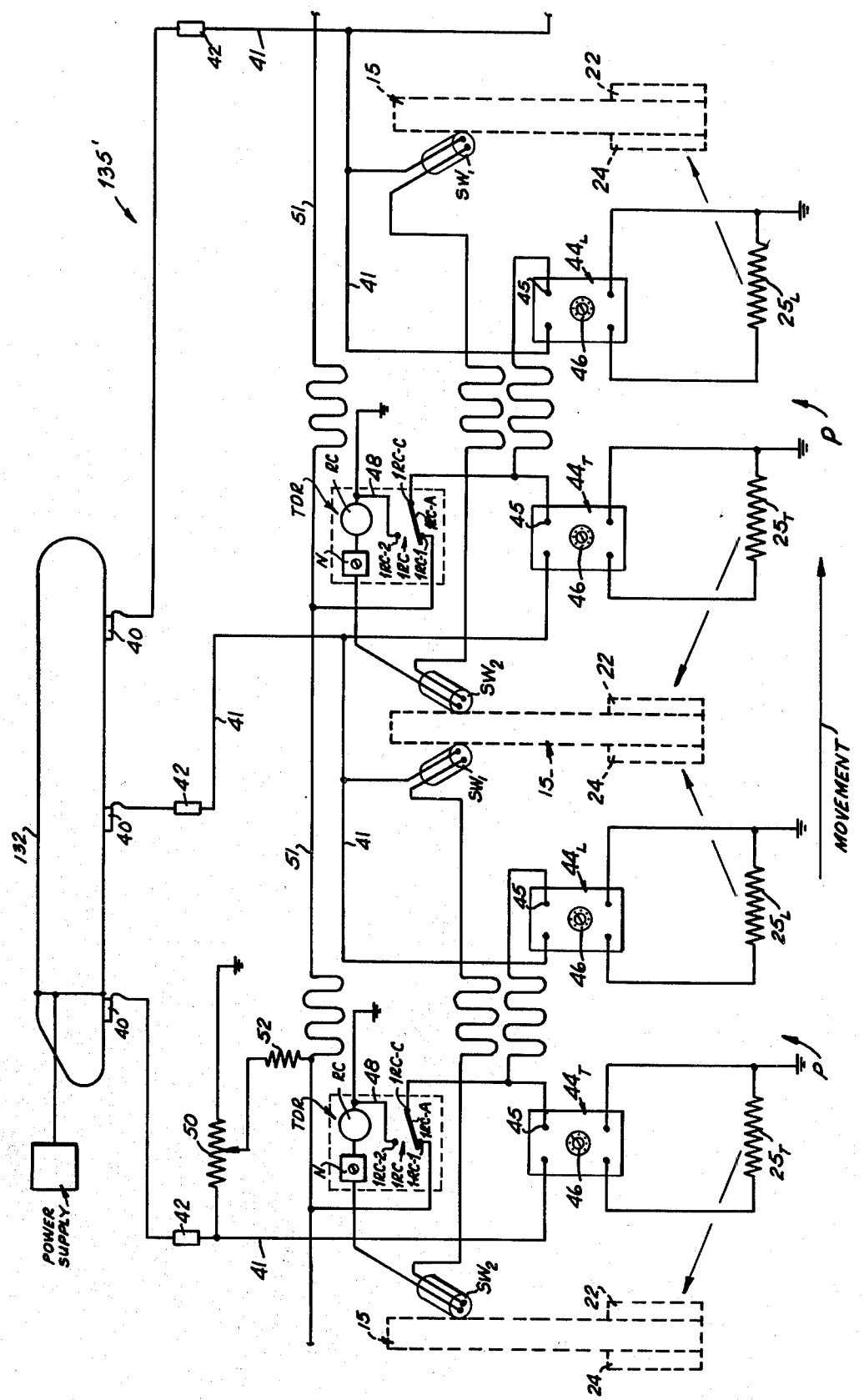
FIG. 4 is an electrical schematic drawing illustrating an alternative control circuit for the compression and welding section shown in FIG. 2.
Figure 5:
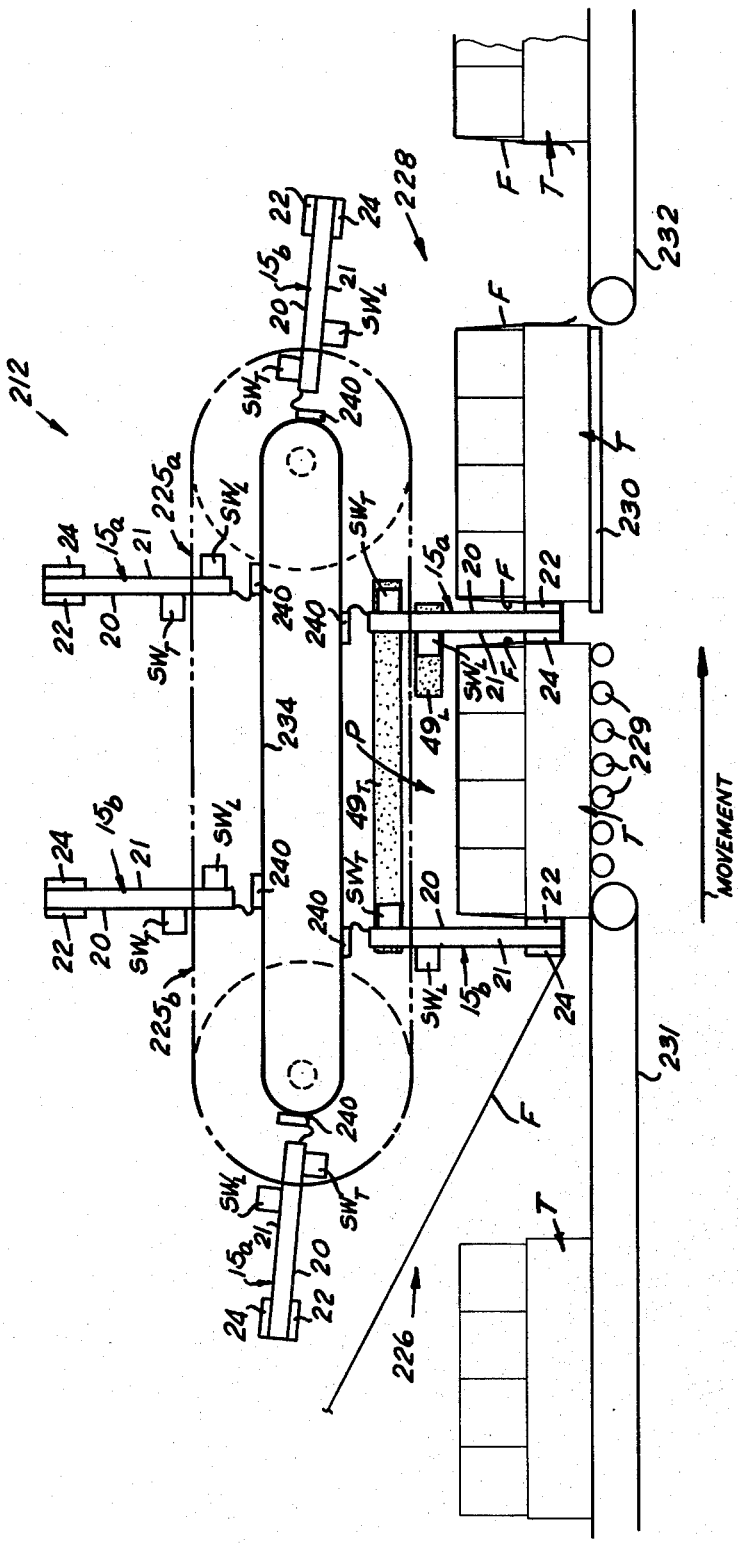
FIG. 5 is a schematic drawing illustrating another type of compression and welding section of the machine embodying the invention.

FIG. 4 schematically illustrates a portion of a modified control circuit for the compression and welding section 112 which has been designated 135'. Those components of control circuit 135' which are the same as those of control circuit 135 have the same numbers applied thereto. The difference between the control circuit 135' and the control circuit 135 lies in the switches used to start the timing of the time delay relay TDR.

In control circuit 135', the time delay network N for relay TDR in each pocket P is connected to one of the wires 41 to the flight bars 15 associated with the pocket through a pair of mercury switches $SW_1$ and $SW_2$. Mercury switch $SW_1$ is mounted on the flight bar 15 leading the pocket P while the mercury switch $SW_2$ is mounted on the flight bar 15 trailing the pocket P. The mercury switches $SW_1$ and $SW_2$ are oriented on the flight bars 15 so that the switch contacts thereof will be closed when the flight bar 15 mounting the switch is in a vertical position on the lower flight of the chains 125. Thus, when the flight bar 15 moves onto the lower flight of the chains 125, the switch mounted thereon will close. The switches $SW_1$ and $SW_2$ are connected in series so that the time delay relay TDR is not connected to the hot wire 41 until both switches $SW_1$ and $SW_2$ are closed. Thus, as the flight bar 15 on the leading side of the pocket moves onto the lower flights of chains 125, the switch $SW_1$ closes. However, switch $SW_2$ remains open so that relay TDR is not powered. As soon as the flight bar 15 on the trailing side of the pocket P moves onto the lower flights of the chains 125, the tray will be captivated between the heating units 22 and 24 in the pocket and the switch $SW_2$ will close so that the time delay relay TDR is powered to start the timing thereof. As the pocket P moves the tray toward the discharge end of the compression and welding section 112, the time delay relay carries out its time function the same as that disclosed for the control circuit 135. As soon as the flight bar 15 leading the pocket P moves off the lower flights of the chains 125 at the discharge end of the section 112, the contacts in switch $SW_1$ will open to remove the power from the relay TDR and stop the timing function.

The controllers $44_L$ and $44_T$, the time delay relay TDR, and the master potentiometer 50 all operate in the same manner as that disclosed for the circuit 135. The welding and holding temperatures used with the circuit 135' and the time delay set in the relay TDR are similar to that of the circuit 135. Thus, it will be seen that the circuit 135' performs the same function as the circuit 135.

Turning now specifically to FIG. 5, it will be seen that the compression and welding section designated 212 is designed to have the capability of applying film to different sizes of trays. Half of the flight bars 15 are mounted between a first pair of endless chains while the other half of the flight bars 15 are mounted between a second pair of endless chains so that the flight bars mounted between the first pair of endless chains alternate with the flight bars mounted between the second pair of endless chains. Both pairs of endless chains move along a common endless path in a side-by-side relationship. For clarity, the flight bars associated with the first pair of endless chains have been designated $15_a$ and the flight bars associated with the second pair of endless chains have been designated $15_b$. Both pairs of endless chains are schematically shown by a single line of FIG. 5 and have been designated $225_a$ and $225_b$. The flight bars 15$_a$ are attached to the chains 225$_a$ so that they project outwardly therefrom at a fixed spacing along these chains. The flight bars 15$_b$ are attached to the chains 225$_b$ so that they project outwardly therefrom at a fixed spacing along these chains. It will be appreciated that the chains 225$_a$ and 225$_b$ can move relative to each other so that the spacing between an adjacent pair of flight bars 15$_a$ and 15$_b$ can be varied. All of the chains 225 are positioned so that, as the flight bars 15 move along the lower horizontal flights of the chains 225, they are vertically oriented. Appropriate locating switches (not shown) are used to stop the flight bars 15$_a$ and 15$_b$ as they move along the lower flights of chains 225 so that a pocket P will be formed between adjacent flight bars 15$_a$ and 15$_b$ as they move along the lower flights of chains 225. This arrangement is described in detail in my co-pending U.S. application Ser. No. 683,611. The chains 225 move in a counterclockwise direction as seen in FIG. 5 so that the flight bars 15 move from the infeed end 226 of section 212 to the discharge end 228 of section 212 (to the right in FIG. 5) as they move along the lower flights of chains 225 and return along the upper flights of the chains.

A plurality of driven support rollers 229 are provided below the pocket P formed between the flight bars 15$_a$ and 15$_b$ as they move along the lower flights of chains 225 to support the trays T on the tops thereof so that the heating units 22 and 24 on the flight bars 15 will engage the side walls of the trays in the pocket P. The flight bars 15$_a$ and 15$_b$ are moved so that the spacing adjacent the flight bars 15$_a$ and 15$_b$ at the pocket P is such that a tray will be captivated between these adjacent flight bars. The trailing flight bar 15$_a$ or 15$_b$ at the pocket P moves with the tray captivated in the pocket over the rollers 229 as the flight bars 15 are advanced to the next position. A skid plate 230 is provided immediately downstream of the pocket P in alignment with support rollers 229 so that the flight bar 15$_a$ or 15$_b$ pushing the tray with the film applied thereto off the support rollers 129 pushes the tray onto the skid plate 230 to keep the leading heating element 22 on the flight bar 15$_a$ or 15$_b$ trailing the tray in contact with the trailing side wall of the tray.

The film F extends under the lower projecting ends of the flight bars 15 moving along the lower flights of chains 225 and is maintained under tension by the unwinder 14 seen in FIG. 1. Each loaded tray T is fed toward the trailing side of that flight bar 15$_a$ or 15$_b$ on the lower flight of chains 225 at the trailing end of the pocket P by a powered infeed conveyor 231 and the driven rollers 229. The spacing of the trays on the infeed conveyor 231 is such that the incoming trays do not interfere with the movement of the flight bars as they are moved by chains 225 as is known in the art. This action forces the leading side wall of the incoming tray against the trailing heating unit 24 on the flight bar 15$_a$ or 15$_b$ at the trailing side of the pocket P so that the film F extends up between the heating unit 24 and the leading side wall of the tray and over the articles in the tray. The chains 225 mounting the flight bar 15$_a$ or 15$_b$ are then advanced in known manner until the flight bar 15$_a$ or 15$_b$ reaches a position at the leading side of the pocket P. The infeed conveyor 231 and the driven rollers 299 maintain the tray against the heating unit 24 on the flight bar 15$_a$ or 15$_b$ at its advanced. As this is occurring, the next flight bar 15$_a$ or 15$_b$ moves onto the lower flights of the chains 225 so that the projecting end thereof engages the top of the film and pulls it tautly over the articles in the tray. This next flight bar moves into a position at the trailing end of the pocket P so that the heating unit 22 on the leading side thereof forces the film against the trailing side wall of the tray in the pocket P. The spacing between the flight bars 15 at the pocket P is such that the film is forced against the side walls of the tray with the necessary pressure to cause the film to bond or weld to the side walls of the tray when the film is heated to welding temperature.

While the tray is in the pocket P, the heating units 22 and 24 on opposite sides of the pocket heat the film in contact with the opposite sides of the tray to welding temperature to affect bonding or welding the film to the tray side walls. After the film is welded to the side walls of the tray in the pocket P and the next tray is fed into the machine, the flight bars 15 are advanced one position so that the flight bar 15$_a$ or 15$_b$ on the trailing side of the pocket P pushes the welded tray onto the slide plate 230 so that the welded tray remains on the skid plate 230 when the next tray has moved into the pocket P. This serves to keep the trailing side wall of the tray against the leading heater 22 on the flight bar 15$_a$ or 15$_b$ located at the leading side of the pocket P to prevent the continuous film from being pulled from the trailing side wall of the already welded tray. This allows the cutting mechanism in the flight bar 15$_a$ or 15$_b$ to sever the film between the trays as the flight bars are advanced to the next position with the flight bar 15$_a$ or 15$_b$ trailing the tray on the skid plate 230 to push the separated tray onto the discharge conveyor 232 for discharge from section 212 in known manner.

The heating units 22 and 24 on the flight bars 15 are electrically powered continuously from the nedless bus bar 234 as they move around the endless path of movement on the chains 225 so that they can normally be maintained at the temperature to which the film must be heated for welding. The time during which the film is heated during normal operation is thus determined by the length of time each tray remains in the pocket P. The compression and welding section 212 is designed so that the flight bars 15 are advanced each time a tray is received. When the trays are fed to the section 212 at its design capacity, the minimum time the tray remains in the pocket P is encountered. Thus, the maximum design speed of the operation of the section 212 is selected so that the tray is maintained under compression in the pocket P for the period of time required to affect welding of the film to the tray when the section 212 is operating at design capacity.

Film similar to that described for use in the section 212 is used in the section 212. Thus, if the flow of trays to section 212 is interrupted, the time that a tray remains in the pocket P may be extended beyond the burn through time for the film. To prevent film burn through, a control circuit 235 is provided which causes the temperature of the heating unit 22 and 24 associated with the pocket P to be reduced to a holding temperature low enough to prevent film burn through if the tray remains in the pocket P for a period of time exceeding the burn through time. It will likewise be appreciated that the temperature of the heating units at the pocket will not be reduced while the section 212 is operating at its normal speed as will become more apparent.

Figure 6:
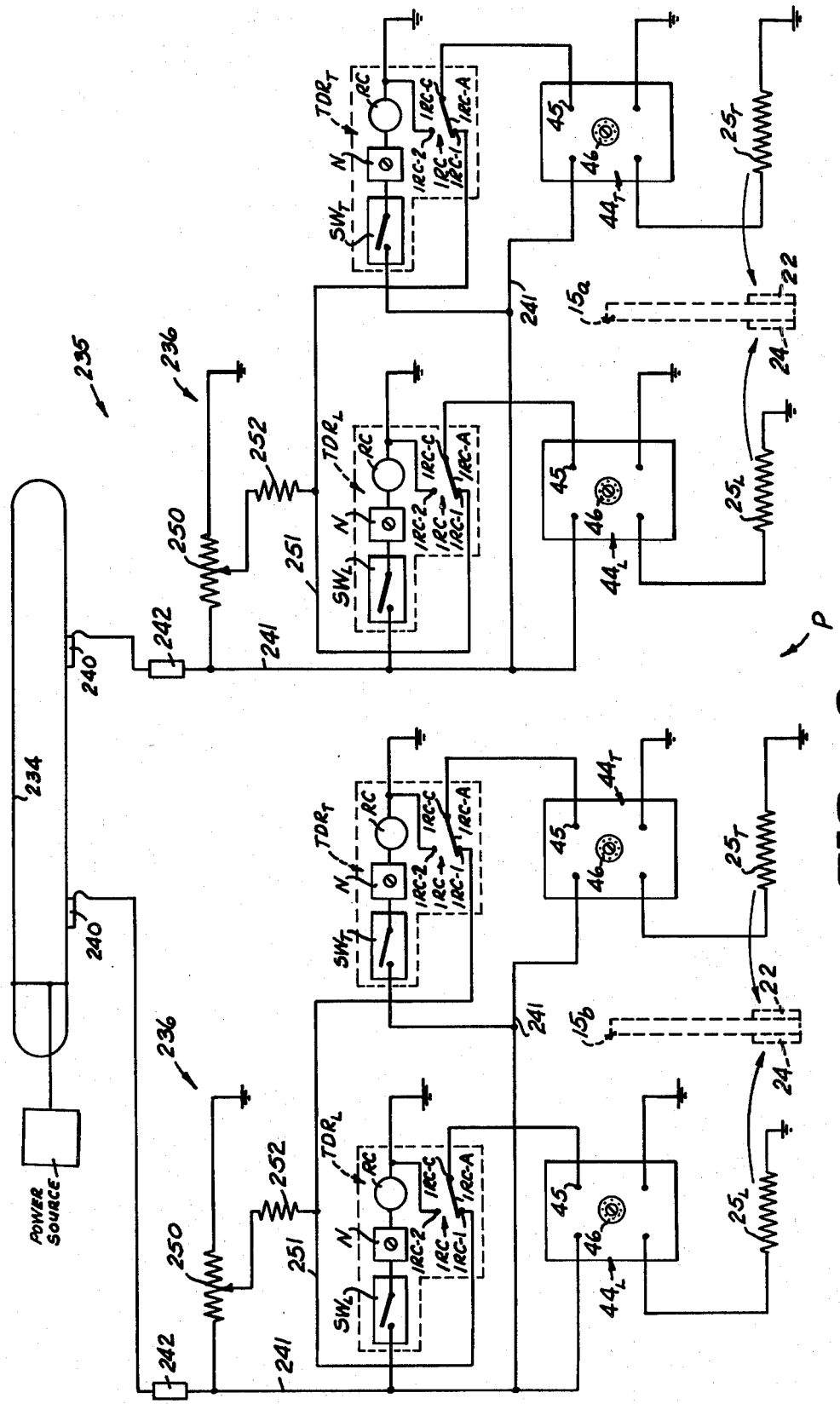
FIG. 6 is an electrical schematic drawing illustrating a control circuit for the compression and welding section shown in FIG. 5.

A portion of control circuit 235 used to control the heating units 22 and 24 on the flight bars 15$_a$ and 15$_b$ is shown in FIG. 6. Because the spacing between flight bars 15$_a$ and 15$_b$ varies as they move along the endless path of chains 225$_a$ and 225$_b$, it is difficult to wire the flight bars together. Thus, a separate subcircuit 236 is provided for each flight bar 15$_a$ and 15$_b$ with all of the subcircuits 236 having the same construction. For sake of simplicity, one of the subcircuits 236 will be described for a typical flight bar 15, it being understood that a subcircuit 236 would be provided for each flight bar 15$_a$ and 15$_b$. Also, subcircuit 236 utilizes the same components as control circuit 135 and the same reference numerals will be utilized when describing these components in subcircuit 236.

It will be appreciated that the leading heating unit 22 on each flight bar presses the film against the trailing side wall of the trays while the trailing heating unit 24 on each flight bar presses the film against the leading side wall of the trays. To distinguish the heating elements of heating units 22 and 24 and relate them to the trays, the heating element in heating unit 22 has been designated 25$_T$ in FIG. 6 while the heating element in heating unit 24 has been designated 25$_L$. Those components used to control heating element 25$_T$ have been designated with subscript T while those used to control heating element 25$_L$ have been designated with subscript L.

The subcircuit 236 on each flight bar 15 is connected to the endless bus bar 234 through a slider contact 240 mounted on the flight bar. The bus bar 234 is continuously powered from an appropriate voltage source. Contact 240 continuously powers a common hot wire 241 through fuse 242.

The heating elements 25$_L$ and 25$_T$ are the same as those described in circuit 135 and are respectively connected to the hot wire 241 through temperature controllers 44$_L$ and 44$_T$ so that the temperatures thereof can be controlled. The controllers 44$_L$ and 44$_T$ are the same as those for circuit 135 with each being provided with a control input 45 and a trim potentiometer 46.

The control input 45 of controller 44$_L$ is controlled by time delay relay TDR$_L$ while control input 45 on controller 44$_T$ is controlled by time delay relay TDR$_T$. Both relays TDR$_L$ and TDR$_T$ have the same construction as relay TDR in circuit 135 with each having a relay switch 1RC, a relay coil RC and variable time delay network N. The common contact 1RC-C in switch 1RC of relay TDR$_L$ is connected to the control input 45 on controller 44$_L$ while the common contact 1RC-C in switch 1RC of relay TDR$_T$ is connected to the control input 45 on controller 44$_T$. The normally closed contacts 1RC-1 of switches 1RC in both relays TDR$_L$ and TDR$_T$ are connected to a welding voltage source while the normally open contacts 1RC-2 of switches 1RC in both relays TDR$_L$ and TDR$_T$ are connected to a holding voltage source as will become more apparent.

The time delay relay TDR$_L$ is controlled by a detection switch SW$_L$ mounted on the flight bar 15 while the time delay relay TDR$_T$ is controlled by detection switch SW$_T$ also mounted on the flight bar 15. Both switches SW$_L$ and SW$_T$ have the same construction as switch SW$_M$ in circuit 135. The detection switch SW$_L$ serves to detect when the heating unit 24 is pressing the film against the leading side of a tray while the detection switch SW$_T$ serves to detect when the heating unit 22 is pressing the film against the trailing side of a tray. This serves to monitor the time that the film is being heated while being pressed against the tray as will become more apparent. It will be appreciated that the heating units 22 and 24 on each flight bar will press the film against the sides of different trays since the heating unit 24 on a flight bar 15 cooperates with the heating unit 22 on the next downstream flight bar 15 to compress the tray in pocket P.

The normally open contacts on switch SW$_L$ connect one side of the coil RC in relay TDR$_L$ to the hot wire 41 through the time delay network N in that relay while the normally open contacts of switch SW$_T$ connect one side of the coil RC in relay TDR$_T$ to the hot wire 41 through the time delay network N in that relay. The other side of the coils RC in the relays TDR$_L$ and TDR$_T$ are connected to ground. The switches SW$_L$ and SW$_T$ are mounted on the flight bar 15 so that they move along parallel, spaced apart paths as the flight bar 15 moves along the lower flights of the chains 225. To actuate switch SW$_L$, a magnetic strip 49$_L$ is fixedly mounted in section 212 adjacent the path of movement of switch SW$_L$ as the flight bar moves along the lower flights of chains 225. To actuate switch SW$_T$, a separate magnetic strip 49$_T$ is fixedly mounted in section 212 adjacent the path of movement of switch SW$_T$ as the flight bar moves along the lower flights of chains 225. Strip 49$_L$ serves to actuate only switch SW$_L$ while strip 49$_T$ serves to actuate only switch SW$_T$.

The magnetic strip 49$_T$ is positioned so that it causes the contacts in switch SW$_T$ to close as soon as the flight 15 assumes a position at the trailing side of pocket P so that the heating unit 22 presses the film against the trailing side of the tray in the pocket P immediately leading flight bar 15. Since heating unit 22 pushes the tray out of the pocket P and onto the skid plate 230 the next time the flight bars are advanced, it continues to press the film against the tray while the flight bar moves to position at the trailing side of the pocket and while the flight bar is located at the trailing side of the pocket until the flight bar is eventually moved away from the trailing side of the pocket to discharge the tray off the skid plate. The length of the magnetic strip 49$_T$ is such that switch SW$_T$ will remain closed while the flight bar 15 is located at the trailing side of the pocket, is located at the leading side of the pocket, and is moving from the trailing to leading side of the pocket.

On the other hand, the magnetic strip 49$_L$ is positioned so that it causes the contacts in switch SW$_L$ to close as soon as flight bar 15 assumes a position at the leading side of pocket P so that the heating unit 24 presses the film against the leading side of the tray in the pocket P immediately trailing flight bar 15. Since heating unit 24 only presses the film against the leading side of the tray while the flight bar 15 is located on the leading side of pocket P, the length of strip 49$_L$ is selected so that switch SW$_L$ only remains closed while flight bar 15 is located on the leading side of pocket P. It will thus be seen that strip 49$_T$ is longer than strip 49$_L$.

From the foregoing, it will be understood that the contacts of switch SW$_T$ close as soon as the flight bar 15 moves into a position at the trailing side of the pocket P to press the film against the tray in the pocket P. This connects the time delay relay TDR$_T$ to the hot wire 41 and starts the timing of relay TDR$_T$. If the time delay network N in relay TDR times out while the magnetic strip 49$_L$ is still maintaining switch SW$_T$ closed, the coil RC of relay TDR$_T$ is energized to transfer the switch arm 1RC-A of that relay from contact 1RC-1 to contact 1RC-2 and maintains the relay switch 1RC of relay TDR$_T$ transferred until switch SW$_T$ is deactuated. Likewise, it will be seen that the contacts of switch SW$_L$ close when the flight bar 15 has moved to a position at the leading side of the pocket P so that the heater 24 is pressing the film against the leading side of the next tray which is moved into pocket P. This serves to connect the time delay relay $TDR_L$ to the hot wire 241. If the time delay network N in relay $TDR_L$ times out while the magnetic strip $49_L$ is still maintaining switch $SW_L$ closed, the relay coil RC thereof is energized to transfer the switch arm 1RC-A in relay $TDR_L$ from contact 1RC-1 to contact 1RC-2 and maintains the relay switch 1RC in the relay $TDR_L$ transferred until switch $SW_L$ is deactuated.

The welding voltage source comprises a control potentiometer 250 powered from the hot wire 241. The adjustable output from potentiometer 250 is connected to a common control hot wire 251 through a voltage limiting resistor 252. The control hot wire 251 is connected to the normally closed contacts 1RC-1 of both of the time delay relays $TDR_L$ and $TDR_T$ associated with the flight bar 15. Thus, it will be seen that the adjustable voltage output from potentiometer 250 is supplied to the control input 45 of temperature controller $44_L$ when the switch arm of its associated relay $TDR_L$ is closed on contact 1RC-1 in relay $TDR_L$ and is supplied to the control input 45 of temperature controller $44_T$ when the switch arm of its associated relay $TDR_T$ is closed on contact 1RC-1 in relay $TDR_T$. Thus, rather than having a single potentiometer 50 controlling the temperature controllers on all of the flight bars as described for circuit 135, circuit 235 has a separate potentiometer 250 on each flight bar controlling only the temperature controllers on that flight bar. The resistor 252 serves to prevent excessive voltage and to prevent current overloads in the temperature control portion of the subcircuit 236 in the event of electrical shorts and is typically selected to have a resistance value of about one-half that of the total resistance of the temperature control portion of subcircuit 236.

The holding voltage source of this particular embodiment is also electrical ground. Thus, the normally open contact 1RC-2 in each of the relays $TDR_L$ and $TDR_T$ is shunted to ground so that a zero voltage is applied to the control input 45 of the temperature controller $44_L$ when contact 1RC-2 in relay $TDR_L$ is closed and a zero voltage is applied to the control input 45 of temperature controller $44_T$ when contact 1RC-2 in relay $TDR_T$ is closed. It will be appreciated that the holding voltage source may be provided by the adjustable output of an appropriate potentiometer if the trim potentiometers 46 in controllers $44_L$ and $44_T$ do not have adjustability and range to cause the desired holding temperature to be maintained by the heating elements 25 controlled by them when the control voltage is zero.

To set up the section 212 for operation, the inputs 45 of the temperature controllers $44_L$ and $44_T$ in each subcircuit 236 is grounded. The trim potentiometers 46 on controllers $44_L$ and $44_T$ are then adjusted until the desired holding temperature is being maintained in the heating units 22 and 24 by the heating elements $25_L$ and $25_T$. It will be appreciated that this also trims both of the temperature controllers $44_L$ and $44_T$ in subcircuits 236 so that both of the heating units 22 and 24 are maintained at a near common temperature. Then, with the control inputs on the temperature controllers $44_L$ and $44_T$ connected to the output of control potentiometer 250, potentiometer 250 is adjusted until the desired welding temperature is maintained in both heating units 22 and 24. The time delay networks N in the time delay relays $TDR_L$ and $TDR_T$ are adjusted to the desired maximum permissible welding time. After this process has been repeated for all subcircuits 236, the compression and welding section 212 should now be ready for operation.

As each flight bar 15 moves into position at the trailing side of the pocket P, the heating unit 22 thereon presses the film against the trailing side of the tray in the pocket. The switch $SW_T$ associated therewith has now moved into proximity with the magnetic strip $49_T$ and is closed to power relay $TDR_T$. Strip $49_T$ keeps switch $SW_T$ closed until the flight bar 15 has moved past the position on the leading side of pocket P to discharge the tray away from the heating unit 22 on the flight bar. Under normal operation, the film and tray will be discharged away from the heating unit 22 before relay $TDR_T$ controlling same times out so that the input 45 on controller $44_T$ remains connected to the output of control potentiometer 250. In the event of an interruption in the flow of trays to section 212 so that the heating unit 22 is still pressing the film against the tray when the relay $TDR_T$ times out, the switch arm 1RC-A therein transfers to close contact 1RC-2 and switch the input 45 on controller $44_T$ connected thereto to ground. This causes controller $44_T$ to lower the temperature of the heating element $25_T$ in the heating unit 22 to the holding temperature at which burn through will not occur. The element $25_T$ remains at this lower holding temperature until the tray is discharged away from the heating unit 22 as switch $SW_T$ clears stip $49_T$ whereupon switch $SW_T$ opens to de-energize relay $TDR_T$ and reconnect the input 45 on controller $44_T$ to the output of potentiometer 250.

As each flight bar 15 moves into position at the leading side of the pocket P, the heating unit 24 thereon presses the film against the leading side of the tray which has moved into the pocket. The switch $SW_L$ associated therewith has now moved into proximity with the magnetic strip $49_L$ and is closed to power relay $TDR_L$. Strip $49_L$ keeps switch $SW_L$ closed as long as the flight bar 15 remains in position at the leading side of the pocket. As soon as the flight bar 15 moves away from the leading side of the pocket, the heating unit 24 thereon moves out of contact with the film and tray and switch $SW_L$ clears strip $49_L$ to open switch $SW_L$ and de-energize relay $TDR_L$. Under normal operation, the heating unit 24 will move out of contact with the film and tray before time delay relay $TDR_L$ controlling same times out so that the input 45 on controller $44_L$ remains connected to the output of control potentiometer 250. In the event of an interruption in the flow of trays to section 212 so that heating unit 24 is still pressing the film against the tray when relay $TDR_L$ times out, the switch arm 1RC-A therein transfers to close contact 1RC-2 and switch input 45 on controller $44_L$ thereto to ground. This causes controller $44_L$ to lower the temperature of the heating element $25_L$ in heating unit 24 to the holding temperature at which burn through will not occur. The element $25_L$ remains at this lower temperature until the switch $SW_L$ clears strip $49_L$ as the heating unit 24 clears the film and tray whereupon switch $SW_L$ opens to de-energize relay $TDR_L$ and reconnect the input 45 on controller $44_L$ to the output of potentiometer 250.

In the event either of the heating units 22 or 24 on flight bar 15 is lowered to the holding temperature while the flight bar 15 mounting same is associated with pocket P, they can recover to welding temperature as the flight bar returns to the infeed end 226 of section 212 along the upper flights of chains 225.

What is claimed as invention is:

1. In apparatus for packaging articles in a tray by applying a film of thermoplastic material over the articles in the tray including a plurality of electrically operated heating units successively moving along a prescribed endless path and adapted to captivate each tray and the film over the articles in the tray between adjacent heating units as the heating units move along a prescribed portion of the prescribed path to press the film against opposite sides of the tray and heat the film to a temperature to cause the film to bond to the tray, the improvement comprising:

temperature control means for continuously powering each of said heating units while said heating units move around said endless path and for individually controlling the temperature of said heating units;

detection means for detecting when each of said heating units is in position to press the film against the tray;

timing means operatively connected to said temperature control means and said detection means, said timing means being activated when said detection means detects that said heating unit is in position to press the film against the tray and deactivated when said detection means detects that said heating unit is out of position to press the film against the tray, said timing causing said temperature control means to lower the temperature of said heating unit from a prescribed higher welding temperature sufficient to bond the film to the tray to a prescribed lower holding temperature to prevent deterioration of the film after said timing means has been activated for a prescribed period of time and said timing means causing said temperature control means to raise the temperature of said heating unit back to said prescribed higher welding temperature when said timing means is deactivated.

2. In the apparatus as set forth in claim 1 wherein said improvement further comprises said detection means being constructed and arranged to detect when each pair of adjacent heating units is in position to captivate a tray therebetween to press the film against opposite sides of the tray.

3. In the apparatus as set forth in claim 1 wherein said improvement further comprises a first voltage source and a second voltage source, wherein said temperature control means includes a control input for causing said temperature control means to vary the temperature of the heating unit controlled thereby in response to the voltage at said control input, and wherein said timing means is constructed and arranged to connect said control input to said second voltage source after said timing means has been activated for said prescribed period of time to cause the temperature of said heating unit controlled thereby to be lowered to said holding temperature and to connect said control input to said first voltage source while said timing means is deactivated and until said timing means has been activated for said prescribed period of time to cause the temperature of the heating unit controlled thereby to be maintained at said welding temperature.

4. In the apparatus as set forth in claim 3 wherein said improvement further comprises said first voltage source being adjustable and said second voltage source being electrical ground.

5. In the apparatus as set forth in claim 1 wherein the heating units are arranged in pairs adapted to press the film against opposite sides of the tray and wherein said improvement further comprises said temperature control means including a plurality of first temperature controllers and a plurality of second temperature controllers, one of each of the pairs of heating units being connected to one of said plurality of first temperature controllers to control the temperature thereof and the other of each of the pairs of heating units being connected to one of said plurality of second temperature controllers to control the temperature thereof; said detection means including a plurality of detection switch means, each of said detection switch means operatively associated with one of the pairs of heating units and adapted to be actuated while the pair of heating units associated therewith are in position to press the film against the tray; and said timing means including a plurality of time delay relays, one of said time delay relays operatively connected with each of said detection switch means and operatively connected to said first and second temperature controllers connected to the pair of heating units associated with said detection switch means so that said time delay relay is activated while said detection switch means is actuated, said time delay relay causing said first and second temperature controllers connected thereto to lower the temperature of the pair of heating units from the prescribed higher welding temperature to the prescribed lower holding temperature after said time delay relay has been activated for a prescribed period of time and causing said first and second temperature controllers to raise the temperatures of the pair of heating units back to the prescribed higher welding temperature when said time delay relay is deactivated.

6. In the apparatus as set forth in claim 5 wherein said improvement further comprises a first voltage source and a second voltage source, wherein each of said temperature controllers includes a control input for causing said temperature controller to vary the temperature of the heating unit controlled thereby in response to the voltage at said control input, and wherein each of said time delay relays is constructed and arranged to connect said control inputs on said first and second temperature controllers connected thereto to said second voltage source after said time delay relay has been activated for said prescribed period of time to cause the temperature of the pair of heating units controlled thereby to be lowered to said holding temperature and to connect said control inputs on said first and second temperature controllers connected thereto to said first voltage source while said time delay relay is deactivated and until said time delay relay has been activated for said prescribed period of time to cause the temperature of the pair of heating units controlled thereby to be maintained at said welding temperature.

7. In the apparatus as set forth in claim 6 wherein said improvement further comprises a magnetic strip mounted at a fixed position along the path of movement of the pairs of heating units while the heating units are in position to press the film against the tray and wherein each of said detection switch means includes a magnetically actuated switch mounted for movement with the pair of heating units associated therewith so that said magnetic strip actuates each of said magnetically actuated switches while the pair of heating units associated therewith is in position to press the film against the tray.

8. In the apparatus as set forth in claim 6 wherein said improvement further comprises each of said detection switch means including a first mercury switch mounted for movement with one of the pair of heating units associated with said detection switch means and oriented so that said first mercury switch is actuated when the one of the pair of heating units is in position to press the film against the tray; and a second mercury switch mounted for movement with the other of the pair of heating units associated with said detection switch means and oriented so that said second mercury switch is actuated when the other of the pair of heating units is in position to press the film against the tray, said first and second mercury switches connected in series to said time delay relay associated with the pair of heating units so that said time delay relay is activated only while both said first and second mercury switches are actuated.

9. In the apparatus as set forth in claim 6 wherein said improvement further comprises an endless busbar fixedly mounted adjacent the path of movement of the heating units for supplying electrical power and sliding contact means for continuously connecting each of said temperature controllers to said busbar so that each of said heating units is continuously powered through said temperature controllers.

10. In the apparatus as set forth in claim 9 wherein said improvement further comprises said first voltage source including a master potentiometer powered from said busbar through one of said sliding contacts and having a selectively variable voltage output, said selectively variable voltage output selectively connected to the control input of each of said temperature controllers through said time delay relay associated therewith; said second voltage source being electrically ground; and each of said temperature controllers further including adjustment means for adjusting the temperatures of the heating unit connected to said temperature controller while said controller input on said temperature controller is connected to said first voltage source and said second voltage source.

11. In the apparatus as set forth in claim 1 wherein the heating units are mounted on flight bars successively moving along the prescribed path with each of the flight bars mounting a first heating unit on the leading side of the flight bar and a second heating unit on the trailing side of the flight bar so that each tray and the film over the articles in the tray will be captivated between adjacent flight bars with the first heating unit pressing the film against the trailing side of one tray and with the second heating unit pressing the film against the leading side of another tray as the flight bars move along the prescribed portion of the prescribed path; and wherein said improvement further comprises said temperature control means including a plurality of first temperature controllers and a plurality of second temperature controllers, each of the first heating units being connected to one of said plurality of first temperature controllers to control the temperature thereof and each of the second heating units being connected to one of said plurality of second temperature controllers to control the temperature thereof; said detection means including a plurality of first detection switch means and a plurality of second detection switch means; and said timing means including a plurality of first time delay relays and a plurality of second time delay relays, each of said first temperature controllers operatively connected to one of said first time delay relays and each of said first time delay relays operatively connected to one of said first detection switch switch means, and each of said second temperature controllers operatively connected to one of said second time delay relays and each of said second time delay relays operatively connected to one of said second detection switch means, each of said first detection switch means adapted to be actuated while the first heating unit associated therewith is in position to press film against a tray and each of said second detection switch means adapted to be actuacted while the second heating unit associated therewith is in position to press the film against a tray so that each of said first time delay relays is activated while said first detection switch means associated therewith is actuated and so that each of said second time delay relays is activated while said second detection switch means associated therewith is actuated, each of said first time delay relays causing said first temperature controller connected thereto to lower the temperature of the first heating unit connected thereto from the prescribed higher welding temperature to the prescribed lower holding temperature after said first time delay relay has been activated for a prescribed period of time and causing said first temperature controller to raise the temperature of the first heating unit connected thereto back to the prescribed higher welding temperature when said first time delay relay is deactivated, and each of said second time delay relays causing said second temperature controller connected thereto to lower the temperature of the second heating unit connected thereto from the prescribed higher welding temperature to the prescribed lower holding temperature after said second time delay relay has been activated for a prescribed period of time and causing said second temperature controller to raise the temperature of the second heating unit connected thereto back to the prescribed higher welding temperature when said second time delay relay is deactivated.

12. In the apparatus as set fort in claim 11 wherein said improvement further comprises a first magnetic strip mounted at a first fixed position along the path of movement of the flight bars while the flight bars are in position to press the film against the tray and a second magnetic strip mounted at a second fixed position along the path of movement of the flight bars while the flight bars are in position to press the film against the tray, and wherein each of said first detection switch means includes a first magnetically actuated switch mounted on the flight bar associated therewith for movement with the flight bar past said first magnetic strip so that said first magnetic strip actuates each of said first magnetically actuated switches while the first heating unit on each of the flight bars is in position to press the film against the tray, and wherein each of said second detection switch means includes a second magnetically actuated switch mounted on the flight bar associated therewith for movement therewith so that said second magnetic strip actuates each of said second magnetically actuated switches while the second heating unit on the flight bar is in position to press the film against the tray.

13. In the apparatus as set forth in claim 12 wherein said improvement further comprises a plurality of first voltage sources, one of said first voltage sources being associated with each of the flight bars; and a second voltage source, wherein each of said first and second temperature controllers includes a control input for causing said temperature controller to vary the temperature of the heating unit controlled thereby in response to the voltage at said control input, wherein each of said first time delay relays is constructed and arranged to connect said control input on said first temperature controller connected thereto to said second voltage source after said first time delay relay has been activated for said prescribed period of time to cause the temperature of the first heating unit controlled thereby to be lowered to said holding temperature and to connect said control input on said first temperature controller connected thereto to said first voltage source associated with the flight bar while said first time delay relay is deactivated and until said first time delay relay has been activated for said prescribed period of time to cause the temperature of the first heating unit controlled thereby to be maintained at said welding temperature, and wherein each of said second time delay relays is constructed and arranged to connect said control input on said second temperature controller connected thereto to said second voltage source after said second time delay relay has been activated for said prescribed period of time to cause the temperature of the second heating unit controlled thereby to be lowered to said holding temperature and to connect said control input on said second temperature controller connected thereto to said first voltage source associated with the flight bar while said second time delay relay is deactivated and until said second time delay relay has been activated for said prescribed period of time to cause the temperature of the second heating unit controlled thereby to be maintained at said welding temperature.

* * * * *